United States Patent [19]

Leary et al.

[11] 4,064,204

[45] Dec. 20, 1977

[54] MANUFACTURE OF NUCLEAR FUEL COMPACTS

[75] Inventors: David F. Leary, San Diego; Roy G. Cooper, Rancho Santa Fe; Gary N. Miertschin, San Diego, all of Calif.

[73] Assignee: General Atomic Company, San Diego, Calif.

[21] Appl. No.: 510,390

[22] Filed: Sept. 30, 1974

[51] Int. Cl.$^2$ ............................................. G21C 21/02
[52] U.S. Cl. ................................. 264/.5; 252/301.1 R
[58] Field of Search ...................... 264/.5; 252/301.1 R

[56] References Cited

U.S. PATENT DOCUMENTS

| | | | |
|---|---|---|---|
| 2,968,551 | 1/1961 | North et al. | 264/.5 |
| 2,991,601 | 7/1961 | Glotter et al. | 264/.5 |
| 3,075,244 | 1/1963 | Glenn | 264/.5 |
| 3,179,722 | 4/1965 | Shoemaker | 264/.5 |
| 3,179,723 | 4/1965 | Goeddel | 264/.5 |
| 3,284,372 | 11/1966 | Bailey | 264/.5 |
| 3,309,434 | 3/1967 | Blum et al. | 264/.5 |
| 3,368,004 | 2/1968 | Sirianni et al. | 264/.5 |
| 3,468,985 | 9/1969 | Bildstein et al. | 264/.5 |
| 3,504,058 | 3/1970 | Masselot et al. | 264/.5 |

OTHER PUBLICATIONS

"Fundamental Principles of Powder Metallurgy," Jones, Arnold Ltd., London pp. 301-312.

*Primary Examiner*—Samuel W. Engle
*Assistant Examiner*—S. A. Cangialosi
*Attorney, Agent, or Firm*—Fitch, Even, Tabin & Luedeka

[57] ABSTRACT

Nuclear fuel rods are manufactured utilizing a graphite flour-pitch matrix formulation containing an additive. The matrix formulation has a decreased viscosity at fabrication temperatures which permits manufacture of the fuel rods with lower fabrication pressures. Also, the matrix formulation does not cause the fuel rod to adhere or bond to the fuel element during heat treatment of the fuel rod in the fuel element. The nuclear fuel rods are suitable for use in high temperature gas cooled nuclear reactors.

10 Claims, No Drawings

MANUFACTURE OF NUCLEAR FUEL COMPACTS

The present invention relates generally to improvements in the manufacture of nuclear fuel materials suitable for use in high temperature gas cooled nuclear reactors. More particularly, the present invention relates to a composition suitable for the manufacture of nuclear fuel compacts at lower fabrication pressures and without the use of externally applied mold release agents.

Nuclear fuel compacts in the form of rods are used in high temperature gas cooled nuclear reactors. Such nuclear fuel rods are generally manufactured by surrounding nuclear fuel particles with a matrix which consists of a mixture of graphite flour and pitch. As used herein, the term "pitch" refers to residual products resulting from the destructive distillation of such organic materials as coal, petroleum and wood. The nuclear fuel rods are formed in a metallic mold by either of two methods. In one method, the mold is filled with nuclear fuel particles and a hot graphite-pitch matrix is injected into the mold so as to surround the nuclear fuel particles. In another method, a graphite-pitch matrix is prepared and granulated. The granulated matrix is mixed with nuclear fuel particles to provide a molding mixture containing nuclear fuel particles. The molding mixture of granulated matrix and nuclear fuel particles is then filled into the mold. Thereafter the molding mixture is heated and compressed within the mold. In both methods, after the fuel rod is formed in the mold, the mold is cooled and the fuel rod is ejected from the mold by pushing the fuel rod from the mold.

The viscosity of the matrix of graphite flour and pitch at the temperature at which the fuel rod is formed by the above described methods is an important factor in determining the pressure required to provide a suitably dense nuclear fuel compact. It is desirable to reduce the viscosity to permit lower fabrication pressures to be used. Excessive fabrication pressures can result in damage to the nuclear fuel particles during formation of nuclear fuel rod. It would be desirable to provide an additive for nuclear fuel molding mixtures which would act to reduce the fabrication pressure when fuel rods are formed from the molding mixture.

After ejection from the mold, the green fuel rod is placed in a graphite fuel element and is heated to between 1200° and 2000° C to carbonize the hydrocarbons. The graphite fuel element usually has a hexagonally shaped cross section and an array of between about 50 to about 210 holes for receiving the fuel rods. An approximately equal number of coolant holes extend through the length of the graphite fuel element. The heat treatment causes the binder material in the fuel rod matrix to undergo simultaneous decomposition and carbonization.

A plurality of green fuel rods are placed in each fuel hole. During the carbonizing heat treatment the green fuel rods tend to slump and adhere to the walls of the fuel holes in the graphite fuel element. Such adherence is detrimental to subsequent operation of the fuel element in that differential expansion or contraction of the graphite fuel element and the fuel rods may result in cracking of the fuel rods. It would be desirable to reduce or eliminate the tendency of the fuel rods to adhere to the walls of the fuel holes during the carbonizing heat treatment.

Accordingly, it is a principal object of the present invention to provide an improved method for the manufacture of nuclear fuel rods suitable for use in high temperature gas cooled reactors. It is another object of the present invention to provide a matrix formulation suitable for use in the preparation of nuclear fuel rods which has a lower viscosity at fabrication temperatures, thereby permitting fuel rod fabrication at lower temperatures and increased productivity. It is a further object of the present invention to provide a matrix formulation suitable for use in the preparation of nuclear fuel rods which decreases or eliminates the adhesion of fuel rods to graphite fuel elements after heating of the fuel rods in the graphite fuel elements.

Generally, in accordance with various features of the present invention, nuclear fuel rods are manufactured, utilizing a graphite flour-pitch matrix formulation having an additive homogeneously dispersed therein. The matrix formulation has a decreased viscosity at fabrication temperatures which permits manufacture of the fuel rods with lower fabrication pressures. Also, the matrix formulation does not cause the fuel rod to adhere or bond to the fuel element during heat treatment of the fuel rod in the fuel element. The nuclear fuel rods are suitable for use in high temperature gas cooled nuclear reactors.

In the method of manufacture, a matrix of pitch, and graphite flour is formed. The matrix is preferably formed by heating the pitch to an elevated temperature of from about 100° C to about 300° C and thoroughly mixing the graphite flour with the pitch at the elevated temperature to uniformly blend the graphite flour and pitch. The mixture is thereafter cooled. Upon cooling the mixture is ground to provide a particulate matrix with a particle size suitable for nuclear fuel rod formation. The matrix may also be formed by grinding the pitch to a suitable particle size and blending the graphite flour with the ground pitch to provide the matrix. The additive may be dispersed in the matrix either during or after its preparation, as will be explained more fully hereinafter.

In one embodiment of the invention, the matrix is blended with a suitable amount of a particulate nuclear fuel material to form a molding mixture. Thereafter, nuclear fuel rods are formed by placing the molding mixture into a steel mold and compressing the molding mixture in the mold.

In another embodiment of the invention, the matrix is heated and injected into a steel mold filled with particulate nuclear fuel material.

In both embodiments, after ejection of the fuel rods from the mold, the fuel rods are placed in a graphite fuel element and are heated to a temperature of between about 1200° to 2000° C.

In accordance with the present invention, an additive is combined with the matrix of graphite flour and pitch. The additive reduces the viscosity of the matrix at the temperature used in the fabrication of the fuel rods and reduces the tendency of the fuel rods to adhere to the graphite fuel element after being heated in the fuel element. The additive also reduces the shear stress required to release the fuel rods from the metal mold in which the fuel rods are fabricated. In this connection, a shear stress of less than about 50 psig is sufficient to release a fuel rod from the metal mold when the additive of the invention is present at the indicated levels.

In general, the additive is selected from saturated and unsaturated alcohols having a carbon chain length of from 12 to 20, saturated and unsaturated fatty acids having a carbon chain length of from 12 to 20, saturated and unsaturated primary amines derived from fatty acids having a carbon chain length of from 12 to 26 and saturated hydrocarbons derived from petroleum having a molecular weight in the range of from about 350 to about 140. The additive is combined with the matrix at a level sufficient to provide from about 0.5 percent to about 30 percent by weight of additive based on the weight of the molding mixture.

The nuclear fuel may be any fissionable or breeder nuclear fuel material usually associated with the manufacture of gas cooled nuclear reactor fuel elements. Suitable nuclear fuel materials are diluted or undiluted pyrolytic carbon coated $ThC_2$, $ThO$, $UO_2$, $UC_2$, $(Th,U)O_2$, or $(Th,U)C_2$ mixtures. The nuclear fuel material is preferably substantially spherical in shape and preferably has a particle size in the range of from about 0.3 to about 1.2 mm.

The graphite flour may be derived from any carbonaceous material and preferably has a particle size of at least less than about 0.040 mm. Preferably the graphite flour has a particle size in the range of from about 0.0002 to about 0.040 mm.

The pitch used in the matrix of the present invention may be any of the residual products resulting from the destructive distillation of coal, petroleum and wood. The pitch has a softening point of less than about 300° F and has a viscosity in the range of from about 100 to about 1000 poises at a temperature of 275° C as measured by an Instron capillary rheometer at a shear rate of 100 $sec^{-1}$.

More particularly, the additive of the present invention is preferably selected from the group consisting of 1-octadecanol, 1-hexadecanol, oleic acid, stearic acid, 1-octadecylamine, petrolatum, and mixtures thereof. As indicated, the additive is used at a level from about 0.5 to about 30 percent by weight of the matrix of graphite flour and pitch and is preferably used at a level of from about 5 to about 15 percent by weight of the matrix. The additives of the present invention provide a matrix which has a viscosity of less than about 1000 poise as determined by means of a capillary viscometer at a temperature of 175° C and a wall shear rate of 100 $sec^{-1}$.

It is preferred to combine the additive with the graphite flour and pitch of the matrix during formation of the matrix. This insures uniform dispersion of the additive in the matrix to provide a blend of the additive and matrix. In this connection, a particularly preferred method for preparing the additive/matrix blend is to heat the pitch to a temperature where it is fluid, i.e., between 100° C and 300° C and to mix the additive with the heated pitch. Thereafter the graphite flour is added to the mixture and the mixture is cooled and ground to provide a matrix with the additive uniformly dispersed therein. However, the additive may be combined with the graphite flour or with ground pitch prior to forming the matrix. A uniform dispersion of the additive in the graphite flour, ground pitch, heated pitch or particulated matrix can be effected by suitable low shear mixing apparatus, such as a sigma blade mixer.

The matrix and additive blend may be used "as is" to surround nuclear fuel particles which have been preloaded into a mold by injecting the heated matrix into the mold. In this method for making fuel rods, the matrix is heated to a temperature of from about 100° C to about 300° C. Generally, injection pressures of from about 500 psig to about 3000 psig are suitable for injecting the matrix containing the additive of the invention.

The matrix and additive blend may also be combined with nuclear fuel particles prior to fabrication to provide a molding mixture suitable for compression in a mold to fabricate nuclear fuel rods. In this method for making fuel rods, the matrix and nuclear fuel particle combination are heated to a temperature of from about 100° C to about 300° C and are then compressed. A fabrication pressure of from about 500 psig to about 3000 psig is generally sufficient to compress the combination and provide a green fuel rod suitable for further heat treatment.

In general, the matrix and additive blend comprises from about 20 to about 50 percent by weight of graphite flour, from about 75 to about 30 percent by weight of pitch and from about 0.5 to about 30 percent by weight of additive. The finished nuclear fuel rod comprises from about 55 percent to about 64 percent of nuclear fuel material by volume and from about 45 to about 36 percent of the matrix and additive blend by volume. As used herein all percentages are by weight, unless otherwise expressed.

As indicated, the additives of the present invention provides a matrix with a reduced viscosity at fabrication temperatures and also provides a fuel rod with improved resistance to adhesion with a fuel element. Also, the additives of the invention have mold release properties. The use of additives in the matrix enables manufacture of nuclear fuel compacts without the use of mold release materials applied to the surface of the molds. The multi-functionality of the additives of the present invention provides a matrix for use in the manufacture of nuclear fuel compacts with greatly enhanced properties.

The following examples further illustrate various features of the present invention but are intended to in no way limit the scope of the invention which is defined in the appended claims.

EXAMPLE I

Six hundred gm batches of a graphite flour-pitch matrix and additive blend were prepared. The batches contained 342 gm of pitch, 240 gm of graphite flour having a particle size of less than about 0.04 and 18 gm of an additive.

A control batch was prepared wherein the additive was replaced with an additional 18 gm of pitch. For each batch the pitch was heated to a temperature of 200° C, the additive was blended with the heated pitch and the graphite flour was then added. The mixture was then blended for thirty minutes in a sigma blade mixer at a temperature of 200° C and at a mixing rate of 100 rpm.

After the batch was cooled, the batch was ground to provide a matrix and additive blend having a particle size in the range of 0.6 to 0.9 mm. The viscosity of the batches was then measured at 175° C and a capillary viscometer. Each of the batches was non-Newtonian showing a decrease in apparent viscosity with increasing shear rate. At a wall shear rate of 100 $sec^{-1}$ the apparent viscosities of the batches, with various additives were as set forth below in Table I.

About 7 grams of the matrix and additive blend was mixed with about 20 grams of a nuclear fuel material consisting of coated $ThC_2$ particles and having a particle size in the range of 0.6 to 0.9 mm.

Each of the batches was then used to prepare nuclear fuel rods by placing the 27 gram batch (20 grams fuel particles, 7 grams matrix) into a steel mold and compressing the batch at a temperature of 190° C and a pressure of 120 psig. After the nuclear fuel rod was formed the wall shear stress necessary to push each of four consecutive rods out of the same mold cavity with no cleaning of the molds between rods was measured. The average wall shear stress value obtained for each of the additives is indicated below in Table II.

Fuel rods fabricated as described above using matrix without additives and fuel rods fabricated using matrix with additives were heat treated to 1800° C in graphite sleeves about 12 inches long, about 0.625 inches inside diameter, and about 0.975 inches outside a diameter with both ends plugged with graphite. It was found that the fuel rods fabricated using matrix without additives adhered to the graphite sleeve, while those fabricated using matrix with additive did not.

Table I

| Additive | Viscosity, Poise |
| --- | --- |
| None | 2350 |
| Petrolatum (avg. molecular weight-approx. 500) | 610 |
| 1-Octodecanol | 600 |
| Paraffin wax (avg. molecular weight-approx. 700) | 770 |
| Oleic acid | 920 |
| Stearic acid | 660 |
| 1-Hexadecanol | 800 |
| Stearic acid + paraffin (50:50) | 660 |
| Stearic acid + 1-Octadecanol (50:50) | 660 |
| 1-Octadecylamine | 800 |

Table II

| Additive | Shear Stress, PSI |
| --- | --- |
| None | 1900 |
| Petrolatum | 8.71 |
| 1-Octadecanol | 0.61 |
| Paraffin wax (avg. molecular weight-approx. 700) | 31.28 |
| Oleic acid | 2.11 |
| Stearic acid | 0.73 |
| 1-Hexadecanol | 3.56 |
| Stearic acid + paraffin (50:50) | 1.21 |
| Stearic acid + 1-Octadecanol (50:50) | 0.95 |

EXAMPLE II

Further batches of a graphite flour, pitch and additive matrix were prepared having the formulation set forth below in Table III. The apparent viscosity of each of the batches was determined. Each of the matrix batches was then used to prepare fuel rods by the injection method. In this method, about 20 grams of $ThC_2$ nuclear fuel particles having a particle size in the range of 0.6 to 0.9 mm, were placed in a 15.9 mm diameter cylindrical steel mold. About 7 grams of coarsely ground matrix having a particle size of about 0.6 mm were placed on top of the fuel particles in the mold. The mold was then heated to a temperature of 200° C and a piston was used to force the matrix through the fuel particles to form fuel rods having a length of 61 mm. The average shear stress required to remove four fuel rods from the mold was measured and is reported below in Table III.

Table III

| Graphite Flour-grams | Pitch[1]-grams | Additive grams | Additive Type | Apparent Viscosity at 175° C and 100 sec$^{-1}$-poise | Average Shear Stress-psig |
| --- | --- | --- | --- | --- | --- |
| 180[2] | 402 | 18 | 1-Octadecanol | 410 | 12.6 |
| 180[2] | 384 | 36 | " | 420 | 14.5 |
| 198[2] | 384 | 18 | " | 460 | 14.5 |
| 198[2] | 384 | 60 | " | 270 | 10.6 |
| 240[3] | 324 | 36 | " | 380 | 14.8 |
| 240[4] | 324 | 36 | " | 260 | 2.0 |

[1]Obtained from Ashland Oil Co. and identified as A-240
[2]Obtained from Asbury Graphite Corp. and identified as grade 6353
[3]Obtained from Great Lakes Carbon Co. and identified as grade 1089
[4]Obtained from Lonza Ltd. and identified as grade KS-44.

By the present invention, a matrix composition with reduced viscosity is provided for the manufacture of nuclear fuel rods intended for use in gas cooled nuclear reactors. The invention also provides a matrix composition that reduces the adhesion of the fuel rods to graphite fuel elements after heating the fuel rods in the fuel element.

What is claimed is:

1. A method for making nuclear fuel rods comprising forming a matrix comprising graphite flour, pitch and a viscosity reducing additive, combining said matrix with nuclear fuel particles to provide a molding mixture, placing said molding mixture in a mold and compressing said molding mixture while heating said molding mixture to a temperature of from about 100° C to about 300° C, to form a nuclear fuel rod, said additive being selected from the group consisting of saturated and unsaturated alcohols having a carbon chain length of from 12 to 20, saturated and unsaturated fatty acids having a carbon chain length of from 12 to 20, saturated and unsaturated primary amines derived from fatty acids having a carbon chain length of from 12 to 20 and saturated hydrocarbons derived from petroleum having a molecular weight in the range of from about 350 to about 1400, said additive being present at a level of from about 2 to about 12 percent by weight of said matrix, said graphite flour being present at a level of from about 25 to about 45 percent by weight of said matrix, and said pitch being present at a level of from about 43 to about 73 percent by weight of said matrix.

2. A method in accordance with claim 1 wherein said additive is selected from the group consisting of 1-octadecanol, 1-hexadecanol, oleic acid, stearic acid, 1-octadecylamine, petrolatum, and mixtures thereof.

3. A method in accordance with claim 1 wherein said additive is present in said matrix at a level of from about 5 to about 10 percent by weight.

4. A method in accordance with claim 1 wherein said matrix has a viscosity of less than about 1000 poises as determined by a capillary viscometer at a temperature of 175° C and a wall shear rate of 100 sec$^{-1}$.

5. A method in accordance with claim 1 wherein said fuel rod releases from said mold with a shear stress of less than about 50 psig.

6. A method for making nuclear fuel rods comprising forming a matrix said matrix comprising graphite flour, pitch and a viscosity reducing additive, heating said matrix to a temperature of from about 100° C to about 300° C and injecting said matrix into a mold containing nuclear fuel particles to form a nuclear fuel rod, said additive being selected from the group consisting of saturated and unsaturated alcohols having a carbon chain length of from 12 to 20, saturated and unsaturated fatty acids having a carbon chain length of from 12 to 20, saturated and unsaturated primary amines derived from fatty acids having a carbon chain length of from 12 to 20 and saturated hydrocarbons derived from petroleum having a molecular weight in the range of from about 350 to about 1400, said additive being present at a level of from about 2 to about 12 percent by weight of said matrix, said graphite flour being present at a level of from about 25 to 45 percent by weight of said matrix, and said pitch being present at a level of from about 43 to 73 percent by weight of said matrix.

7. A method in accordance with claim 6 wherein said additive is selected from the group consisting of 1-octadecanol, 1-hexadecanol, oleic acid, stearic acid, 1-octadecylamine, petrolatum, and mixtures thereof.

8. A method in accordance with claim 6 wherein said additive is present in said matrix at a level of from about 5 to about 10 percent by weight.

9. A method in accordance with claim 6 wherein said matrix has a viscosity of less than about 1000 poises as determined by a capillary viscometer at a temperature of 175° C and a wall shear rate of 100 sec$^{-1}$.

10. A method in accordance with claim 6 wherein said fuel rod releases from said mold with a shear stress of less than about 50 psi.

* * * * *

UNITED STATES PATENT AND TRADEMARK OFFICE
CERTIFICATE OF CORRECTION

PATENT NO. : 4,064,204
DATED : December 20, 1977
INVENTOR(S) : Leary, Cooper and Miertschin It is certified that error appears in the above-identified patent and that said Letters Patent are hereby corrected as shown below:

Col. 5, line 3: "120" should read --1200--.

Signed and Sealed this

Fourth Day of July 1978

[SEAL]

Attest:

RUTH C. MASON
Attesting Officer

DONALD W. BANNER
Commissioner of Patents and Trademarks